July 27, 1926.
J. A. JOHNSTON
TRACTOR BRAKE
Filed August 6, 1924
1,594,203
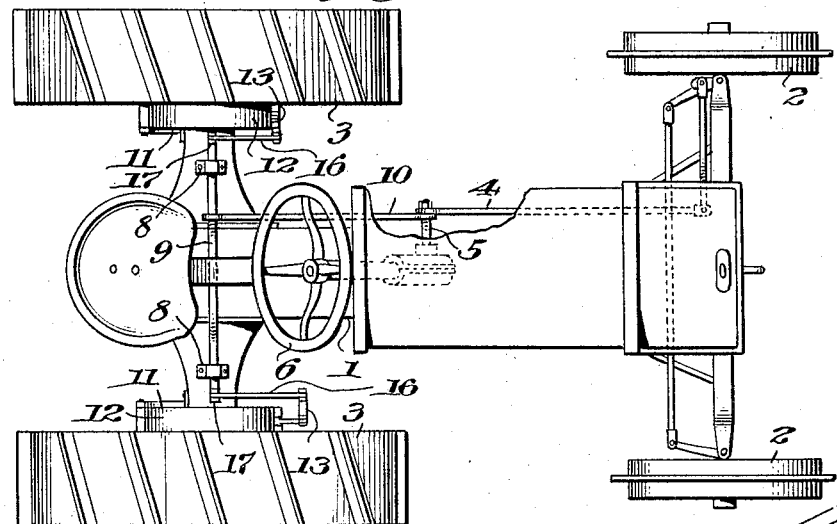
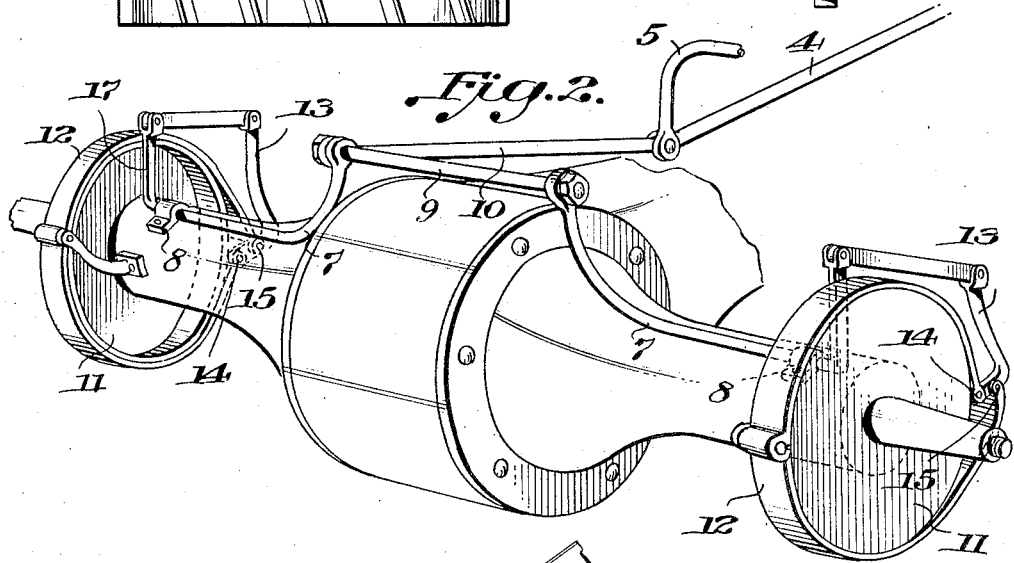
Inventor;
James A. Johnston,
By Wm. R. Andrews, Atty.

Patented July 27, 1926.

1,594,203

UNITED STATES PATENT OFFICE.

JAMES A. JOHNSTON, OF KENWOOD, CALIFORNIA.

TRACTOR BRAKE.

Application filed August 6, 1924. Serial No. 730,477.

My invention relates to a brake for tractors, the object being to provide improved means operated by the steering gear of the machine, adapted to apply the brake to that one of the rear wheels which is on the side of the tractor toward which the turn is being made, thus retarding said wheel and facilitating turning.

My brake is so constructed and adapted to operate that, ordinarily, the brake is not applied in making a wide turn to the left or to the right but when a very short turn is made, the necessary turning of the steering wheel through a wider or greater arc, results in application of the brake, as aforesaid.

The brake rod for my invention is connected to the steering arm on the outside of the gear transmission case, by preference, although the invention is not necessarily limited in this fashion.

It is to be understood that my invention is only used in combination with the steering gear and that I do not propose to "brake" or "cramp" one of the rear wheels except by means operated from the usual steering gear and then, by preference, only when very short turns are made, as the brakes for both rear wheels are ordinarily unapplied when wide turns are made.

Only one embodiment of the invention is illustrated and it is to be understood that modifications may be resorted to without departing from the essential principle of the invention.

In the accompanying drawings:

Figure 1 is a plan view of a tractor equipped with my improvements;

Fig. 2 is an enlarged perspective view of the brake mechanism; and

Fig. 3 is a detail side elevation of the operating connections to the steering gear.

A tractor is shown, more or less conventionally, by the frame 1, the front steering wheels 2 and the rear wheels 3.

Any ordinary, or well known steering gear 4 is provided for the front wheels, said gear being operated by the well known steering arm 5 operated by steering wheel 6.

My invention resides in combining with the steering means, my improved braking means which will now be described.

A brake rock shaft 7, which is suitably journaled in bearings 8 on the rear axle housing, or otherwise, has its bail 9 connected by brake rod 10 to the steering arm 5, so that the brake rod 10 will be shifted and the brake rock shaft 7 turned when the steering arm 5 moves.

The rear wheels 3 are provided with brake drums 11 which are adapted to be engaged by brake bands 12. The brake bands 12 are opened and closed by bell crank levers 13 to which the ends of the brake bands are pivoted at 14 and 15. The bell crank levers are connected by links 16 to arms 17 on the rock shaft 7.

The leverages and clearances are such that during ordinary turns, the brake rod 10 would only be moved a sufficient distance to rock the shaft 7 through such a small arc that the brake bands 12 will not bear on the drums 11. When, however, the steering wheel 6 is turned an unusual distance, as when the tractor is to make a very short turn, the brake rod 10 is moved and the brake band 12 on that side of the tractor toward which the turn is to be made will be sufficiently contracted to embrace the drum 11 but the brake band 12 on the other wheel will be let off or expanded. Consequently a braking action will be effected on the rear wheel which will be the so-called pivotal wheel and this results in so retarding the pivotal wheel that the sharp turn is more quickly had than would be the case were no such braking action provided.

I claim:

In a brake for vehicles, the combination with independent and oppositely acting friction band brakes for the rear wheels thereof, of a steering arm, a steering wheel for operating said arm, a rock shaft, a brake rod connecting the rock shaft with the steering arm, said rock shaft having levers which are operatively connected to the rsepective brakes in oppositely coupled fashion for the purpose of tightening the brake band on the "pivotal" wheel when a short turn is made, while releasing the brake band of the other wheel, said bands being sufficiently loose so that the rock shaft will be insufficiently turned to apply either brake when a wide turn is made.

In testimony whereof I affix my signature.

JAMES A. JOHNSTON.